(12) United States Patent
Hart et al.

(10) Patent No.: US 8,123,648 B2
(45) Date of Patent: *Feb. 28, 2012

(54) EIGHT SPEED AUTOMATIC TRANSMISSION

(75) Inventors: James M. Hart, Belleville, MI (US);
Andrew W. Phillips, Rochester, MI (US); Scott H. Wittkopp, Ypsilanti, MI (US); Clinton E. Carey, Highland, MI (US); Madhusudan Raghavan, West Bloomfield, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/090,117

(22) Filed: Apr. 19, 2011

(65) Prior Publication Data

US 2011/0195814 A1    Aug. 11, 2011

Related U.S. Application Data

(63) Continuation of application No. 12/045,231, filed on Mar. 10, 2008, now Pat. No. 7,951,039.

(60) Provisional application No. 60/909,379, filed on Mar. 30, 2007.

(51) Int. Cl.
*F16H 3/62* (2006.01)
*F16H 3/44* (2006.01)

(52) U.S. Cl. ........ 475/275; 475/276; 475/311; 475/317; 475/323

(58) Field of Classification Search .......... 475/275–292, 475/296, 295, 303, 311–313, 317–319, 323–325
See application file for complete search history.

(56) References Cited

U.S. PATENT DOCUMENTS

| | | | |
|---|---|---|---|
| 6,176,803 B1 | 1/2001 | Meyer et al. | |
| 6,558,287 B2 | 3/2003 | Hayabuchi et al. | |
| 6,984,187 B2 | 1/2006 | Biermann | |
| 6,991,578 B2 | 1/2006 | Ziemer | |
| 7,011,597 B2 | 3/2006 | Haka | |
| 7,018,319 B2 | 3/2006 | Ziemer | |
| 7,101,305 B2 | 9/2006 | Tabata et al. | |
| 7,163,484 B2 | 1/2007 | Klemen | |
| 7,798,935 B2* | 9/2010 | Wittkopp et al. | 475/288 |
| 7,951,039 B2* | 5/2011 | Hart et al. | 475/276 |
| 2005/0090362 A1 | 4/2005 | Abe et al. | |
| 2006/0270513 A1 | 11/2006 | Klemen | |
| 2006/0270516 A1 | 11/2006 | Klemen | |
| 2008/0242487 A1 | 10/2008 | Hart et al. | |

* cited by examiner

*Primary Examiner* — Tisha Lewis

(57) ABSTRACT

An automatic transmission is provided having an input member, an output member, four planetary gear sets, a plurality of coupling members and a plurality of torque transmitting devices. Each of the planetary gear sets includes first, second and third members. The torque transmitting devices may include clutches and brakes.

15 Claims, 2 Drawing Sheets

| GEAR STATE | GEAR RATIO | RATIO STEP | TORQUE TRANSMITTING DEVICES ||||| 
|---|---|---|---|---|---|---|---|
| | | | 30 | 34 | 32 | 26 | 28 |
| REV | -3.428 | | X | X | X | | |
| N | | -0.76 | O | O | | | |
| 1ST | 4.530 | | X | X | | X | |
| 2ND | 3.171 | 1.43 | X | X | | | X |
| 3RD | 2.182 | 1.45 | | X | | X | X |
| 4TH | 1.684 | 1.30 | | X | X | | X |
| 5TH | 1.279 | 1.32 | | X | X | X | |
| 6TH | 1.000 | 1.28 | | | X | X | X |
| 7TH | 0.862 | 1.16 | X | | X | X | |
| 8TH | 0.700 | 1.23 | X | | X | | X |

X = ON - ENGAGED CARRYING TORQUE
O = ON - ENGAGED NOT CARRYING TORQUE

FIG. 3

EIGHT SPEED AUTOMATIC TRANSMISSION

CROSS-REFERENCE TO RELATED APPLICATIONS

This application is a continuation of U.S. Ser. No. 12/045,231 filed on Mar. 10, 2008, which claims the benefit of U.S. Provisional Application No. 60/909,379 filed on Mar. 30, 2007. The disclosure of the above application is incorporated herein by reference.

FIELD

The invention relates generally to a multiple speed automatic transmission having a plurality of planetary gear sets and a plurality of torque transmitting devices and more particularly to an eight speed automatic transmission having four planetary gear sets and a plurality of torque transmitting devices.

BACKGROUND

The statements in this section merely provide background information related to the present disclosure and may or may not constitute prior art.

A typical multiple speed automatic transmission uses a combination of friction clutches, planetary gear arrangements and fixed interconnections to achieve a plurality of gear ratios. The number and physical arrangement of the planetary gear sets, generally, are dictated by packaging, cost and desired speed ratios.

While current automatic transmissions achieve their intended purpose, the need for new and improved transmission configurations which exhibit improved performance, especially from the standpoints of efficiency, responsiveness and smoothness and improved packaging, primarily reduced size and weight, is essentially constant. Accordingly, there is a need for an improved, cost-effective, compact multiple speed automatic transmission.

SUMMARY

An automatic transmission is provided having an input member, an output member, four planetary gear sets, a plurality of coupling members and a plurality of torque transmitting devices. Each of the planetary gear sets includes first, second and third members. The torque transmitting devices may be either clutches or brakes.

One embodiment of the transmission includes an input member, an output member, and first, second, third and fourth planetary gear sets each having first, second and third members. A first interconnecting member continuously interconnects the first member of the first planetary gear set with the first member of the third planetary gear set and the third member of the fourth planetary gear set. A second interconnecting member continuously interconnects the second member of the first planetary gear set with a stationary member. A third interconnecting member continuously interconnects the third member of the first planetary gear set with the third member of the second planetary gear set. Five torque transmitting devices are selectively engageable to interconnect one of the first members, second members, and third members with at least one of the first members, second members, third members, and the stationary member. The torque transmitting devices are selectively engageable in combinations of at least three to establish at least eight forward speed ratios and at least one reverse speed ratio between the input member and the output member.

In one aspect of the present invention, a first of the five torque transmitting devices is selectively engageable to interconnect at least one of the second member of the third planetary gear set and the input member with the second member of the fourth planetary gear set.

In another aspect of the present invention, a second of the five torque transmitting devices is selectively engageable to interconnect the third member of the third planetary gear set with the second member of the fourth planetary gear set.

In yet another aspect of the present invention, a third of the five torque transmitting devices is selectively engageable to interconnect the first member of the fourth planetary gear set with at least one of the second member of the first planetary gear set and the stationary member.

In yet another aspect of the present invention, a fourth of the five torque transmitting devices is selectively engageable to interconnect the third member of the third planetary gear with at least one of the second member of the second planetary gear set and the output member.

In yet another aspect of the present invention, a fifth of the five torque transmitting devices is selectively engageable to interconnect the first member of the fourth planetary gear set with the first member of the second planetary gear set.

In yet another aspect of the present invention, the first members are sun gears, the second members are carrier members, and the third members are ring gears.

In yet another aspect of the present invention, the input member is continuously interconnected with the second member of the third planetary gear set and the output member is continuously interconnected with the second member of the second planetary gear set.

In yet another aspect of the present invention, four of the torque transmitting devices are clutches and one of the torque transmitting devices is a brake.

In yet another aspect of the present invention, the stationary member is a transmission housing.

Another embodiment of the transmission of the present invention includes an input member, an output member, first, second, third and fourth planetary gear sets each having a sun gear, a carrier member, and a ring gear, wherein the input member is continuously interconnected with the carrier member of the third planetary gear set and the output member is continuously interconnected with the carrier member of the second planetary gear set. A first interconnecting member continuously interconnects the sun gear of the first planetary gear set with the sun gear of the third planetary gear set and the ring gear of the fourth planetary gear set. A second interconnecting member continuously interconnects the carrier member of the first planetary gear set with a stationary member. A third interconnecting member continuously interconnects the ring gear of the first planetary gear set with the ring gear of the second planetary gear set. A first torque transmitting device is selectively engageable to interconnect at least one of the carrier member of the third planetary gear set and the input member with the carrier member of the fourth planetary gear set. A second torque transmitting device is selectively engageable to interconnect the ring gear of the third planetary gear set with the carrier member of the fourth planetary gear set. A third torque transmitting device is selectively engageable to interconnect the sun gear of the fourth planetary gear set with at least one of the carrier member of the first planetary gear set and the stationary member. A fourth torque transmitting device is selectively engageable to interconnect the ring gear of the third planetary gear with at least one of the carrier member of the second planetary gear set and the output member. A fifth torque transmitting device is selectively engageable to interconnect the sun gear of the fourth planetary gear set with the sun gear of the second planetary gear set. The torque transmitting devices are selectively engageable in combinations of at least three to establish at least eight forward speed ratios and at least one reverse speed ratio between the input member and the output member.

Further objects and advantages of the present invention will become apparent by reference to the following description and appended drawings wherein like reference numbers refer to the same component, element or feature.

DRAWINGS

The drawings described herein are for illustration purposes only and are not intended to limit the scope of the present disclosure in any way.

FIG. 3 is a truth table presenting the state of engagement of the various torque transmitting devices in each of the available forward and reverse speeds or gear ratios of the automatic transmission illustrated in FIGS. 1 and 2.

DETAILED DESCRIPTION

The following description is merely exemplary in nature and is not intended to limit the present disclosure, application, or uses.

At the outset, it should be appreciated that in the particular example provided, the eight speed automatic transmission of the present invention has an arrangement of permanent mechanical connections between the elements of the four planetary gear sets. These permanent mechanical connections relate the transmission embodiments. More specifically, a first component or element of a first planetary gear set is permanently coupled to a first component or element of a second planetary gear set. A second component or element of the first planetary gear set is permanently coupled to a ground or stationary member. A third component or element of the first planetary gear set is permanently coupled to a first component or element of a third planetary gear set and to a first component or element of a fourth planetary gear set.

Figure 1:
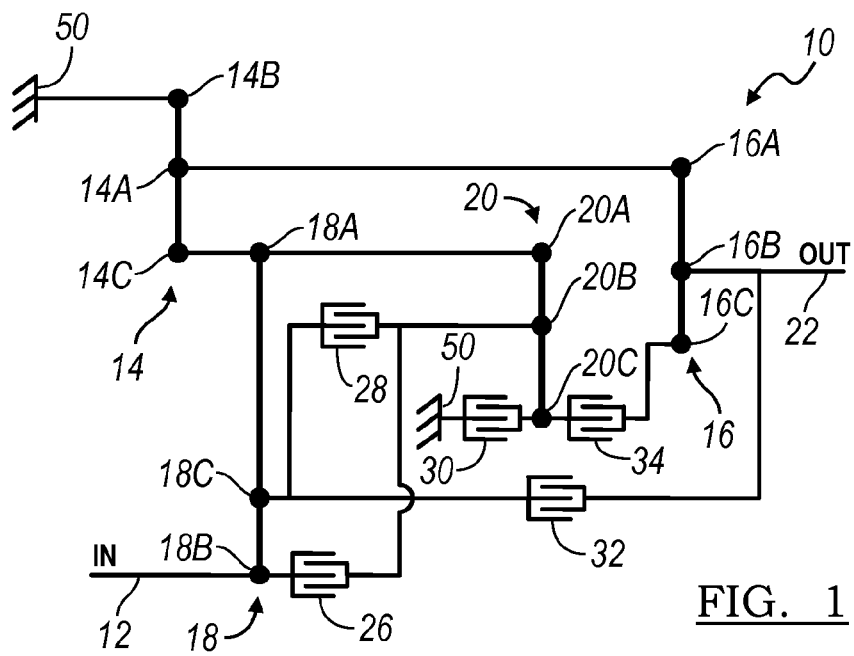
FIG. 1 is a lever diagram of an embodiment of an eight speed automatic transmission according to the present invention.

Referring now to FIG. 1, an embodiment of an eight speed automatic transmission 10 is illustrated in a lever diagram format. A lever diagram is a schematic representation of the components of a mechanical device such as an automatic transmission. Each individual lever represents a planetary gear set wherein the three basic mechanical components or members of said planetary gear are each represented by a node. Therefore, a single lever contains three nodes: one for the sun gear, one for the planet gear carrier, and one for the ring gear. The relative length between the nodes of each lever can be used to represent the ring-to-sun ratio of each respective gear set. These lever ratios, in turn, are used to vary the gear ratios of the transmission in order to achieve an appropriate ratios and ratio progression. Mechanical couplings or interconnections between the nodes of the various planetary gear sets are illustrated by thin, horizontal lines and torque transmitting devices such as clutches and brakes are presented as interleaved fingers. If the device is a brake, one set of the fingers is grounded. Further explanation of the format, purpose and use of lever diagrams can be found in SAE Paper 810102, "The Lever Analogy: A New Tool in Transmission Analysis" by Benford and Leising, which is hereby fully incorporated by reference.

The automatic transmission 10 includes an input shaft or member 12, a first planetary gear set 14 having three nodes: a first node 14A, a second node 14B and a third node 14C, a second planetary gear set 16 having three nodes: a first node 16A, a second node 16B and a third node 16C, a third planetary gear set 18 having three nodes: a first node 18A, a second node 18B and a third node 18C, a fourth planetary gear set 20 having three nodes: a first node 20A, a second node 20B and a third node 20C and an output shaft or member 22.

The first node 14A of the first planetary gear set 14 is coupled to the first node 16A of the second planetary gear set 16. The second node 14B of the first planetary gear set 14 is coupled to a ground, stationary member, or housing 50. The third node 14C of the first planetary gear set 14 is coupled to the first node 18A of the third planetary gear set 18. The first node 18A of the third planetary gear set 18 is coupled to the first node 20A of the fourth planetary gear set 20. The second node 18B of the third planetary gear set 18 is coupled to the input shaft 12. The second node 16B of the second planetary gear set 16 is coupled to the output shaft 22.

A first clutch 26 selectively connects the second node 18B of the third planetary gear set 18 to the second node 20B of the fourth planetary gear set 20. A second clutch 28 selectively connects the third node 18C of the third planetary gear set 18 to the second node 20B of the fourth planetary gear set 20. A first brake 30 selectively connects the third node 20C of the fourth planetary gear set 20 to the ground, stationary member, or transmission housing 50. A third clutch 32 selectively connects the third node 18C of the third planetary gear set 18 to the second node 16B of the second planetary gear set 16 and to output shaft 22. A fourth clutch 34 selectively connects the third node 20C of the fourth planetary gear set 20 to the third node 16C of the second planetary gear set 16 and to output shaft 22.

Figure 2:
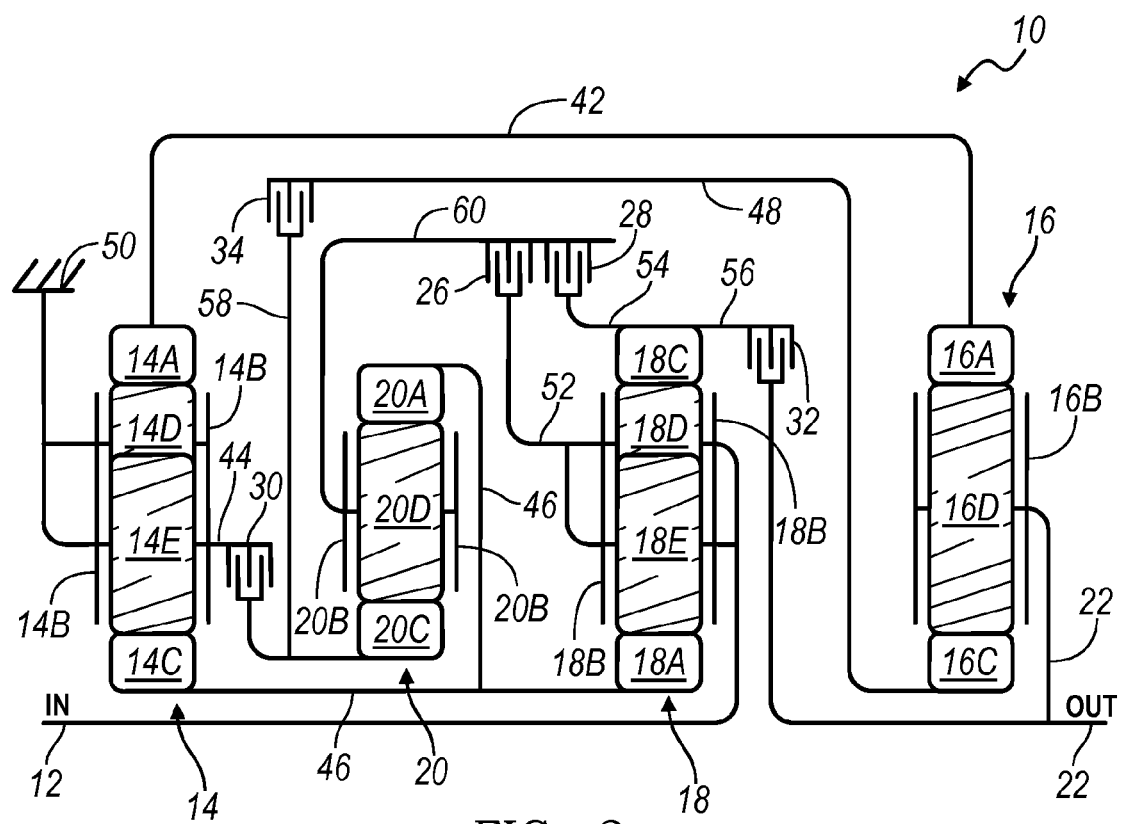
FIG. 2 is a diagrammatic view of an embodiment of an eight speed automatic transmission according to the present invention.

Referring now to FIG. 2, a stick diagram presents a schematic layout of the embodiment of the eight speed transmission 10 according to the present invention. In FIG. 2, the numbering from the lever diagram of FIG. 1 is carried over. The clutches, brake and couplings are correspondingly presented whereas the nodes of the planetary gear sets now appear as components of planetary gear sets such as sun gears, ring gears, planet gears and planet gear carriers.

For example, planetary gear set 14 includes a ring gear member 14A, a planet gear carrier member 14B and a sun gear member 14C. Ring gear member 14A is connected for common rotation with a first interconnecting shaft or member 42. The planet gear carrier member 14B rotatably supports a first set of planet gears 14D (only one shown) and a second set of planet gears 14E (only one shown) and is connected to a second interconnecting shaft or member 44 and to ground, stationary member, or transmission housing 50. Sun gear member 14C is connected for common rotation with a third interconnecting shaft or member 46. First set of planet gears 14D are each configured to intermesh with both ring gear member 14A and second set of planet gears 14E. Second set of planet gears 14E are each configured to intermesh with both first set of planet gears 14D and with sun gear member 14C.

The input shaft 12 is continuously connected to an engine (not shown) or to a turbine of a torque converter (not shown). The output shaft 22 is continuously connected with the final drive unit or transfer case (not shown).

Planetary gear set 16 includes a sun gear member 16C, a planet carrier member 16B that rotatably supports a set of planet gears 16D and a ring gear member 16A. Sun gear member 16C is connected for common rotation with a fourth interconnecting shaft or member 48. Planet carrier member 16B is connected for common rotation with output shaft 22. Ring gear member 16A is connected for common rotation with the first interconnecting shaft 42. Planet gears 16D are each configured to intermesh with both sun gear member 16C and ring gear member 16A.

Planetary gear set 18 includes a sun gear member 18A, a planet carrier member 18B and a ring gear member 18C. Sun gear member 18A is connected for common rotation with third interconnecting shaft 46. The planet gear carrier member 18B rotatably supports a first set of planet gears 18D (only one shown) and a second set of planet gears 18E (only one shown) and is connected for common rotation with a fifth interconnecting shaft or member 52 and to input shaft 12. Ring gear member 18C is connected for common rotation with a sixth interconnecting shaft or member 54 and a seventh interconnecting shaft or member 56. First set of planet gears 18D are each configured to intermesh with ring gear member 18C and second set of planet gears 18E. Second set of planet gears 18E are each configured to intermesh first set of planet gears 18D and with sun gear member 18A.

Planetary gear set 20 includes a sun gear member 20C, a ring gear member 20A and a planet carrier member 20B that rotatably supports a set of planet gears 20D. Sun gear member 20C is connected for common rotation with an eighth interconnecting shaft or member 58. Ring gear member 20A is connected for common rotation with third interconnecting shaft 46. Planet carrier member 20B is connected for common rotation with a ninth interconnecting shaft or member 60. Planet gears 20D are each configured to intermesh with both sun gear member 20C and ring gear member 20A.

The torque-transmitting devices or clutches 26, 28, 32, 34 and brake 30 allow for selective interconnection of the shafts or interconnecting members, members of the planetary gear sets and the housing. For example, first clutch 26 is selectively engageable to connect fifth interconnecting shaft 52 to ninth interconnecting shaft 60. Second clutch 28 is selectively engageable to connect sixth interconnecting shaft 54 to ninth interconnecting shaft 60. Third clutch 32 is selectively engageable to connect seventh interconnecting shaft 56 to output shaft 22. Fourth clutch 34 is selectively engageable to connect fourth interconnecting shaft 48 to eighth interconnecting shaft 58. Brake 30 is selectively engageable to connect eighth interconnecting shaft 58 to transmission housing 50 to restrict rotation of shaft 58 relative to housing 50.

Referring now to FIGS. 2 and 3, the operation of the embodiment of the eight speed automatic transmission 10 will be described. It will be appreciated that the automatic transmission 10 is capable of transmitting torque from the input shaft 12 to the output shaft 22 in at least eight forward speed or torque ratios and at least one reverse speed or torque ratio. Each forward and reverse speed or torque ratio is attained by engagement of one or more of the torque-transmitting devices (i.e. first clutch 26, second clutch 28, third clutch 32, fourth clutch 34 and brake 30), as will be explained below. FIG. 3 is a truth table presenting the various combinations of torque-transmitting devices that are activated or engaged to achieve the various gear states. Actual numerical gear ratios of the various gear states are also presented although it should be appreciated that these numerical values are exemplary only and that they may be adjusted over significant ranges to accommodate various applications and operational criteria of the automatic transmission 10. An example of the gear ratios that may be obtained using the embodiments of the present invention are also shown in FIG. 3. Of course, other gear ratios are achievable depending on the gear diameter, gear teeth count and gear configuration selected.

To establish gear ratios, three torque transmitting devices are engaged for each gear state. The engaged elements are represented by an "X" in each respective row. For example, to establish reverse gear, brake 30, third clutch 32, and fourth clutch 34 are engaged or activated. Brake 30 connects eighth interconnecting shaft 58 to transmission housing 50 to restrict rotation of shaft 58 relative to housing 50. Third clutch 32 connects seventh interconnecting shaft 56 to output shaft 22. Fourth clutch 34 connects fourth interconnecting shaft 48 to eighth interconnecting shaft 58. Likewise, the eight forward ratios are achieved through different combinations of torque transmitting device engagement, as shown in FIG. 3.

It will be appreciated that the foregoing explanation of operation and gear states of the eight speed automatic transmission 10 assumes, first of all, that all clutches and brake not specifically referenced in a given gear state are inactive or disengaged and, second of all, that during gear shifts, i.e., changes of gear state, between at least adjacent gear states, a clutch or brake engaged or activated in both gear states will remain engaged or activated.

The description of the invention is merely exemplary in nature and variations that do not depart from the gist of the invention are intended to be within the scope of the invention. Such variations are not to be regarded as a departure from the spirit and scope of the invention.

We claim the following:

1. A transmission comprising:
an input member;
an output member;
first, second, third and fourth planetary gear sets each having first, second and third members;
a first torque transmitting device selectively engageable to interconnect the second member of the third planetary gear set and the input member with the second member of the fourth planetary gear set;
a second torque transmitting device selectively engageable to interconnect the third member of the third planetary gear set with the second member of the fourth planetary gear set;
a third torque transmitting device selectively engageable to interconnect the first member of the fourth planetary gear set with the second member of the first planetary gear set and a stationary member;
a fourth torque transmitting device selectively engageable to interconnect the third member of the third planetary gear with the second member of the second planetary gear set and the output member; and
a fifth torque transmitting device selectively engageable to interconnect the first member of the fourth planetary gear set with the first member of the second planetary gear set, and
wherein the torque transmitting devices are selectively engageable in combinations of at least three to establish at least eight forward speed ratios and at least one reverse speed ratio between the input member and the output member.

2. The transmission of claim 1 further comprising a first interconnecting member rotationally coupled to the first member of the first planetary gear set, the first member of the third planetary gear set and the third member of the fourth planetary gear set.

3. The transmission of claim 1 further comprising a second interconnecting member rotationally coupled to the second member of the first planetary gear set and the stationary member.

4. The transmission of claim 1 further comprising a third interconnecting member rotationally coupled to the third member of the first planetary gear set and the third member of the second planetary gear set.

5. The transmission of claim 1 wherein the first members are sun gears, the second members are carrier members, and the third members are ring gears.

6. The transmission of claim 1 wherein the input member is continuously interconnected with the second member of the third planetary gear set.

7. The transmission of claim 1 wherein the output member is continuously interconnected with the second member of the second planetary gear set.

8. The transmission of claim 1 wherein the stationary member is a transmission housing.

9. A transmission comprising:
an input member;
an output member;
first, second, third and fourth planetary gear sets each having a sun gear, a carrier member, and a ring gear,
a first torque transmitting device selectively engageable to interconnect the carrier member of the third planetary gear set and the input member with the carrier member of the fourth planetary gear set;
a second torque transmitting device selectively engageable to interconnect the ring gear of the third planetary gear set with the carrier member of the fourth planetary gear set;
a third torque transmitting device selectively engageable to interconnect the sun gear of the fourth planetary gear set with the carrier member of the first planetary gear set and a stationary member;
a fourth torque transmitting device selectively engageable to interconnect the ring gear of the third planetary gear with the carrier member of the second planetary gear set and the output member; and
a fifth torque transmitting device selectively engageable to interconnect the sun gear of the fourth planetary gear set with the sun gear of the second planetary gear set, and
wherein the torque transmitting devices are selectively engageable in combinations of at least three to establish at least eight forward speed ratios and at least one reverse speed ratio between the input member and the output member.

10. The transmission of claim 9 further comprising a first interconnecting member continuously interconnecting the sun gear of the first planetary gear set with the sun gear of the third planetary gear set and the ring gear of the fourth planetary gear set.

11. The transmission of claim 9 further comprising a second interconnecting member continuously interconnecting the carrier member of the first planetary gear set with the stationary member.

12. The transmission of claim 9 further comprising a third interconnecting member continuously interconnecting the ring gear of the first planetary gear set with the ring gear of the second planetary gear set.

13. The transmission of claim 9 wherein the input member is continuously interconnected with the carrier member of the third planetary gear set.

14. The transmission of claim 9 wherein the output member is continuously interconnected with the carrier member of the second planetary gear set.

15. The transmission of claim 9 wherein the stationary member is a transmission housing.

* * * * *